(12) United States Patent
Long

(10) Patent No.: US 12,375,912 B2
(45) Date of Patent: Jul. 29, 2025

(54) METHOD AND APPARATUS FOR SERVICE DISCOVERY

(71) Applicant: Telefonaktiebolaget LM Ericsson (publ), Stockholm (SE)

(72) Inventor: Hongxia Long, Shanghai (CN)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 451 days.

(21) Appl. No.: 17/606,619

(22) PCT Filed: Nov. 8, 2019

(86) PCT No.: PCT/CN2019/116682
§ 371 (c)(1),
(2) Date: Oct. 26, 2021

(87) PCT Pub. No.: WO2020/215668
PCT Pub. Date: Oct. 29, 2020

(65) Prior Publication Data
US 2022/0240085 A1    Jul. 28, 2022

(30) Foreign Application Priority Data
Apr. 26, 2019  (WO) ............... PCT/CN2019/084610

(51) Int. Cl.
*H04W 12/06*  (2021.01)
*H04W 12/72*  (2021.01)
*H04W 12/75*  (2021.01)

(52) U.S. Cl.
CPC .......... *H04W 12/06* (2013.01); *H04W 12/72* (2021.01); *H04W 12/75* (2021.01)

(58) Field of Classification Search
CPC ... H04W 40/246; H04W 12/75; H04W 12/72; H04W 12/037; H04W 12/06; H04L 45/308; H04L 67/51
(Continued)

(56) References Cited

U.S. PATENT DOCUMENTS 10,136,318 B1   11/2018  Hancock et al.
10,425,817 B2 *  9/2019  Torvinen ............... H04W 12/72
(Continued)

FOREIGN PATENT DOCUMENTS

CN       102754361 A    10/2012
CN       104012035 B     2/2017
(Continued)

OTHER PUBLICATIONS

Author Unknown, "Technical Specification Group Core Network and Terminals; Numbering, addressing and identification (Release 15)," Technical Specification 23.003, Version 15.6.0, 3GPP Organizational Partners, Dec. 2018, 130 pages.
(Continued)

*Primary Examiner* — Amare F Tabor
(74) *Attorney, Agent, or Firm* — Withrow & Terranova, PLLC

(57) ABSTRACT

Embodiments of the present disclosure provide methods and apparatuses for service discovery. The method comprises determining to initiate an authentication of a user equipment (UE); and sending an authentication request message including an encrypted or unencrypted identity of a subscriber of the UE, a serving network name and routing information of a data management node to an authentication server.

13 Claims, 6 Drawing Sheets

(58) Field of Classification Search
USPC .................................................... 726/3
See application file for complete search history.

(56) References Cited

U.S. PATENT DOCUMENTS

| | | | | |
|---|---|---|---|---|
| 11,228,903 | B2* | 1/2022 | An | H04L 9/0866 |
| 11,297,492 | B2* | 4/2022 | Yang | H04W 12/72 |
| 11,496,882 | B2* | 11/2022 | Baskaran | H04W 8/205 |
| 11,589,228 | B2* | 2/2023 | Yang | H04W 12/069 |
| 11,751,051 | B2* | 9/2023 | You | H04W 12/06 726/6 |
| 2012/0005727 | A1 | 1/2012 | Lee et al. | |
| 2018/0227759 | A1 | 8/2018 | Liu | |
| 2019/0174449 | A1* | 6/2019 | Shan | H04W 60/04 |
| 2021/0058776 | A1* | 2/2021 | Nair | H04W 12/72 |
| 2021/0092603 | A1* | 3/2021 | Yang | H04L 9/0822 |

FOREIGN PATENT DOCUMENTS

| | | |
|---|---|---|
| CN | 106856605 A | 6/2017 |
| EP | 2487973 A1 | 8/2012 |
| WO | 2018008983 A1 | 1/2018 |
| WO | 2019010701 A1 | 1/2019 |

OTHER PUBLICATIONS

Author Unknown, "Technical Specification Group Services and System Aspects; System Architecture for the 5G System; Stage 2 (Release 15)," Technical Specification 23.501, Version 15.4.0, 3GPP Organizational Partners, Dec. 2018, 236 pages.

Author Unknown, "Technical Specification Group Services and System Aspects; System Architecture for the 5G System; Stage 2 (Release 16)," Technical Specification 23.501, Version 16.0.0, 3GPP Organizational Partners, Mar. 2019, 318 pages.

Author Unknown, "Technical Specification Group Services and System Aspects; System Architecture for the 5G System; Stage 2 (Release 16)," Technical Specification 23.501, Version 16.0.2, 3GPP Organizational Partners, Apr. 2019, 317 pages.

Author Unknown, "Technical Specification Group Services and System Aspects; Procedures for the 5G System; Stage 2 (Release 16)," Technical Specification 23.502, Version 16.0.0, 3GPP Organizational Partners, Mar. 2019, 420 pages.

Author Unknown, "Technical Specification Group Core Network and Terminals; 5G System; Principles and Guidelines for Services Definition; Stage 3 (Release 15)," Technical Specification 29.501, Version 15.3.0, 3GPP Organizational Partners, Mar. 2019, 66 pages.

Author Unknown, "Technical Specification Group Core Network and Terminals; 5G System; Authentication Server Services; Stage 3 (Release 15)," Technical Specification 29.509, Version 15.3.0, 3GPP Organizational Partners, Mar. 2019, 49 pages.

Author Unknown, "Technical Specification Group Services and System Aspects; Security architecture and procedures for 5G System (Release 15)," Technical Specification 33.501, Version 15.4.0, 3GPP Organizational Partners, Mar. 2019, 187 pages.

Huawei, et al., "S3-183420: Solution for bootstrapping authentication of AKMA," Third Generation Partnership Project (3GPP), TSG SA WG3 (Security) Meeting #93, Nov. 12-16, 2018, 4 pages, Spokane, USA.

Nokia, "S3-170177: EAP based Secondary authentication by and External Data Network," Third Generation Partnership Project (3GPP), TSG SA WG3 (Security) Meeting #86, Feb. 6-10, 2017, 3 pages, Nice, France.

International Search Report and Written Opinion for International Patent Application No. PCT/CN2019/116682, mailed Jan. 19, 2020, 10 pages.

Office Action for Russian Patent Application No. 2021134399/07, mailed Aug. 5, 2022, 20 pages.

Decision of Rejection for Japanese Patent Application No. 2021-562088, mailed May 16, 2023, 5 pages.

Ericsson, "C4-192209: UDM service discovery based on GroupID and/or RoutingID," 3GPP TSG-CT WG4 Meeting #91, May 13-17, 2019, Reno, Nevada, 7 pages.

Ericsson, "S2-1813387: AUSF and UDM selection in 5GC NFs," 3GPP TSG-SA WG2 Meeting #129Bis, Nov. 26-30, 2018, West Palm Beach, Florida, 6 pages.

Huawei, et al., "S3-183046: Discussion on Protection of initial NAS message," 3GPP TSG-SA WG3 (Security) Meeting #92 ad-hoc, Sep. 24-28, 2018, Harbin, China, 4 pages.

Extended European Search Report for European Patent Application No. 19926253.6, mailed Oct. 25, 2022, 12 pages.

Ericsson, "S2-1811927: Handling UE/USIM with Misconfigured Routing Indicator," 3GPP TSG SA WG2 Meeting #129BIS, Nov. 26-30, 2018, West Palm Beach, Florida, 10 pages.

Qualcomm Incorporated, et al., "S3-183234: Acknowledging possibility of early calculation of EMSK," 3GPP TSG-SA WG3 Meeting #93, Nov. 12-16, 2018, Spokane, Washington, 7 pages.

Notice of Reasons for Rejection for Japanese Patent Application No. 2021-562088, mailed Nov. 22, 2022, 8 pages.

First Office Action for Chinese Patent Application No. 2019800957470, mailed Oct. 20, 2023, 18 pages.

Second Office Action for Chinese Patent Application No. 201980095747.0, mailed Apr. 15, 2024, 8 pages.

\* cited by examiner

METHOD AND APPARATUS FOR SERVICE DISCOVERY

This application is a 35 U.S.C. § 371 national phase filing of International Application No. PCT/CN2019/116682, filed Nov. 8, 2019, which claims the benefit of International Application No. PCT/CN2019/084610, filed Apr. 26, 2019, the disclosures of which are incorporated herein by reference in their entireties.

TECHNICAL FIELD

The non-limiting and exemplary embodiments of the present disclosure generally relate to the technical field of communications, and specifically to methods and apparatuses for service discovery.

BACKGROUND

This section introduces aspects that may facilitate a better understanding of the disclosure. Accordingly, the statements of this section are to be read in this light and are not to be understood as admissions about what is in the prior art or what is not in the prior art.

Currently core network architecture for fifth generation (5G) network such as new radio (NR) has been proposed. FIG. 1 is a diagram illustrating an exemplary 5G system architecture, which is a copy of FIG. 4.2.3-1 of 3rd Generation Partnership Project (3GPP) TS 23.501 V15.4.0, the disclosure of which is incorporated by reference herein in its entirety. As shown in FIG. 1, 5G system architecture may comprise a plurality of network functions (NFs) such as Authentication Server Function (AUSF), Access and Mobility Management Function (AMF), Data Network (DN) (e.g. operator services, Internet access or 3rd party services), Network Exposure Function (NEF), Network Repository Function (NRF), Network Slice Selection Function (NSSF), Policy Control Function (PCF), Session Management Function (SMF), Unified Data Management (UDM), User Plane Function (UPF), Application Function (AF), User Equipment (UE), (Radio) Access Network ((R)AN), etc.

The AMF may support Security Anchor Functionality (SEAF) as specified in 3GPP TS 33.501 V15.4.0, the disclosure of which is incorporated by reference herein in its entirety. The SEAF may provide authentication functionality via the AMF in a serving network.

NRF may support NF service registration and NF service discovery. For the NRF to properly maintain information of available NF instances and their supported services, each NF instance informs the NRF of a list of NF services that it supports and other NF instance information during the NF service registration. Each NF instance may have a NF profile. The NF profile may include NF instance identifier (ID), NF type, Public Land Mobile Network (PLMN) ID, network slice related identifier(s), Fully Qualified Domain Name (FQDN) or Internet protocol (IP) address of NF, NF capacity information, names of supported services, endpoint information of instance(s) of each supported service, etc.

The AUSF may support the following functionality: supports authentication for 3GPP access and untrusted non-3GPP access as specified in 3GPP TS 33.501 V15.4.0.

The UDM may support for the following functionality: Generation of 3GPP Authentication and Key Agreement (AKA) Authentication Credentials; User Identification Handling (e.g. storage and management of Subscription Permanent Identifier (SUPI) for each subscriber in the 5G system); Support of de-concealment of privacy-protected subscription identifier (SUCI); Access authorization based on subscription data (e.g. roaming restrictions), etc. To provide this functionality, the UDM uses subscription data (including authentication data) that may be stored in Unified Data Repository (UDR), in which case a UDM implements the application logic and does not require an internal user data storage and then several different UDMs may serve the same user in different transactions. The UDM may be located in the Home Public Land Mobile Network (HPLMN) of the subscribers it serves, and access the information of the UDR located in the same PLMN.

FIG. 2 shows initiation of authentication procedure and selection of authentication method, which is copy of FIG. 6.1.2-1 of 3GPP TS33.501 V15.4.0. As shown in FIG. 2, the SEAF may initiate an authentication with the UE during any procedure establishing a signalling connection with the UE, according to the SEAF's policy. A user equipment (UE) shall use SUCI or the fifth generation-Globally Unique Temporary UE Identity (5G-GUTI) in the Registration Request. The SEAF shall invoke the Nausf_UEAuthentication service by sending a Nausf_UEAuthentication_Authenticate Request message to the AUSF whenever the SEAF wishes to initiate an authentication. The Nausf_UEAuthentication_Authenticate Request message shall contain either: SUCI, as defined in the current specification, or SUPI, as defined in 3GPP TS 23.501 V16.0.2. The SEAF shall include the SUPI in the Nausf_UEAuthentication_Authenticate Request message in case the SEAF has a valid 5G-GUTI and re-authenticates the UE. Otherwise the SUCI is included in Nausf_UEAuthentication_Authenticate Request. The Nausf_UEAuthentication_Authenticate Request shall furthermore contain the serving network name. Upon receiving the Nausf_UEAuthentication_Authenticate Request message, the AUSF shall check that the requesting SEAF in the serving network is entitled to use the serving network name in the Nausf_UEAuthentication_Authenticate Request by comparing the serving network name with the expected serving network name. The AUSF shall store the received serving network name temporarily. If the serving network is not authorized to use the serving network name, the AUSF shall respond with "serving network not authorized" in the Nausf_UEAuthentication_Authenticate Response. The Nudm_UEAuthentication_Get Request sent from AUSF to UDM includes the following information SUCI or SUPI and the serving network name. Upon reception of the Nudm_UEAuthentication_Get Request, the UDM shall invoke Subscription Identifier De-concealing Function (SIDF) if a SUCI is received. SIDF shall de-conceal SUCI to gain SUPI before UDM can process the request. Based on SUPI, the UDM/Authentication credential Repository & Processing Function (ARPF) shall choose the authentication method, based on the subscription data.

Clause 6.3.8 of 3GPP TS23.501 V16.0.2 has defined UDM discovery and selection. As defined in Clause 6.3.8 of 3GPP TS23.501 V16.0.2, a network function (NF) consumer or a Service Communication Proxy (SCP) performs UDM discovery to discover a UDM instance that manages the user subscriptions. If the NF consumer performs discovery and selection, the NF consumers shall utilize the NRF to discover the UDM instance(s) unless UDM information is available by other means, e.g. locally configured on NF consumers. The UDM selection function in NF consumers selects a UDM instance based on the available UDM instances (obtained from the NRF or locally configured). The UDM selection functionality is applicable to both 3GPP access and non-3GPP access. The UDM selection functionality in NE consumer or in SCP may consider one of the following factors: 1) Home network identifier (e.g. Mobile Network Code (MNC) and Mobile Country Code (MCC)) of SUCI/SUPI and UE's Routing Indicator, 2) UDM Group identity (ID) of the UE's SUPI, 3) SUPI, and 4) GPSI or External Group ID. For example, the UDM selection functionality in NE consumer or in SCP may use the Routing Indicator. The UE may provide the Routing Indicator to the AMF as part of the SUCI as defined in TS 23.003 V15.6.0 during initial registration, the disclosure of which is incorporated by reference herein in its entirety. The UDM selection functionality in NE consumer or in SCP may use UDM Group ID of the UE's SUPI. For example, the AMF can infer the UDM Group ID the UE's SUPI belongs to, based on the results of UDM discovery procedures with NRF.

SUMMARY

This summary is provided to introduce a selection of concepts in a simplified form that are further described below in the detailed description. This summary is not intended to identify key features or essential features of the claimed subject matter, nor is it intended to be used to limit the scope of the claimed subject matter.

As described above, the Nausf_UEAuthentication_Authenticate Request message between AMF and AUSF only contains either SUCI or SUPI, and does not contain service routing information of UDM which is available at AMF to AUSF. This existing solution as defined in 3GPP TS 23.501 V16.0.2 may cause the UDM service discovery and selection in AUSF to take more time and the efficiency of end to end service operation may be low.

To overcome or mitigate the above mentioned problem or other problems or provide a useful solution, the embodiments of the present disclosure propose an improved service discovery solution which can facilitate the service discovery and selection in a NF consumer such as AUSF and improve the end to end service operation efficiency as the service discovery and selection is simplified in the NF consumer such as AUSF. In an embodiment, a NF consumer such as AMF may provide the service routing information for UDM to another NF consumer such as AUSF in authentication information protocol data with UDM Group ID: Identity of the UDM group serving the SUPI or Routing Indicator indicating the Routing Indicator of the UE. Then AUSF can perform UDM discovery and selection based on the service routing information provided from AMF, either UDM group ID or routing indicator of the UE.

In an embodiment, a first NF node such as AMF may provide the service routing information of UDM to a second NF node such as AUSF. The service routing information of UDM may include UDM Group ID, i.e., Identity of the UDM group serving the SUPI or Routing Indicator indicating the Routing Indicator of the UE.

In a first aspect of the disclosure, there is provided a method at an access and mobility management node. The method comprises determining to initiate an authentication with a user equipment (UE); and sending an authentication request message including an encrypted or unencrypted identity of a subscriber of the UE, a serving network name and routing information of a data management node to an authentication server.

In an embodiment, the method according to first aspect of the disclosure may further comprise receiving a registration request message including the encrypted identity of the subscriber of the UE or a globally unique temporary identity of the UE, wherein the globally unique temporary identity of the UE is used by the access and mobility management node to resolve it to the unencrypted identity of the subscriber of the UE.

In an embodiment, the encrypted identity of the subscriber of the UE may be a Subscription Concealed Identifier (SUCI), the unencrypted identity of the subscriber of the UE may be Subscription Permanent Identifier (SUPI), and the globally unique temporary identity of the UE may be the fifth generation-Globally Unique Temporary UE Identity (5G-GUTI).

In an embodiment, the method according to first aspect of the disclosure may further comprise sending an identity request message to the UE; and receiving an identity response message including the encrypted identity of the subscriber of the UE.

In an embodiment, the encrypted identity of the subscriber of the UE may be a Subscription Concealed Identifier (SUCI).

In an embodiment, the routing information of the data management node may include a data management node group identifier or a routing indicator.

In an embodiment, the data management node group identifier may be determined based on the unencrypted identity of the subscriber of the UE and the routing indicator may be determined based on the encrypted identity of the subscriber of the UE.

In an embodiment, the method according to first aspect of the disclosure may further comprise selecting the authentication server based on the encrypted or unencrypted identity of a subscriber of the UE.

In an embodiment, the access and mobility management node may be an access and mobility management function (AMF) node supporting security anchor function (SEAF), the authentication server may be an authentication server function (AUSF) node and the data management node is a Unified Data Management (UDM) node.

In an embodiment, the authentication request message may be a Nausf_UEAuthentication_Authenticate Request message.

In a second aspect of the disclosure, there is provided a method at an authentication server. The method comprises receiving an authentication request message including an encrypted or unencrypted identity of a subscriber of the UE, a serving network name and routing information of a data management node from an access and authentication management node; and selecting a data management node based on the routing information of the data management node.

In an embodiment, the method according to the second aspect of the disclosure may further comprise sending an authentication data get request including the encrypted or unencrypted identity of a subscriber of the UE and the serving network name to the selected data management node.

In an embodiment, the authentication data get request may be a Nudm_UEAuthentication_get request.

In a third aspect of the disclosure, there is provided an apparatus implemented at a first network function repository node. The apparatus may comprise a processor; and a memory coupled to the processor, said memory containing instructions executable by said processor, whereby said apparatus is operative to determine to initiate an authentication with a user equipment (UE); and send an authentication request message including an encrypted or unencrypted identity of a subscriber of the UE, a serving network name and routing information of a data management node from an access and authentication management node to an authentication server.

In a fourth aspect of the disclosure, there is provided an apparatus implemented at a second network function repository node. The apparatus may comprise a processor; and a memory coupled to the processor, said memory containing instructions executable by said processor, whereby said apparatus is operative to receive an authentication request message including an encrypted or unencrypted identity of a subscriber of the UE, a serving network name and routing information of a data management node from an access and authentication management node from an access and authentication management node; and select a data management node based on the routing information of the data management node.

In a fifth aspect of the disclosure, there is provided a computer program product, comprising instructions which, when executed on at least one processor, cause the at least one processor to carry out the method according to the first aspect of the disclosure.

In an sixth aspect of the disclosure, there is provided a computer program product, comprising instructions which, when executed on at least one processor, cause the at least one processor to carry out the method according to the second aspect of the disclosure.

In a seventh aspect of the disclosure, there is provided a computer-readable storage medium storing instructions which when executed by at least one processor, cause the at least one processor to carry out the method according to the first aspect of the disclosure.

In an eighth aspect of the disclosure, there is provided a computer-readable storage medium storing instructions which when executed by at least one processor, cause the at least one processor to carry out the method according to the second aspect of the disclosure.

Many advantages may be achieved by applying the proposed solution according to embodiments of the present disclosure. For example, some embodiments of the present disclosure may facilitate the service discovery and selection in a NF consumer such as AUSF and improve the end to end service operation efficiency as the service discovery and selection is simplified in the NF consumer such as AUSF.

BRIEF DESCRIPTION OF THE DRAWINGS

The above and other aspects, features, and benefits of various embodiments of the present disclosure will become more fully apparent, by way of example, from the following detailed description with reference to the accompanying drawings, in which like reference numerals or letters are used to designate like or equivalent elements. The drawings are illustrated for facilitating better understanding of the embodiments of the disclosure and not necessarily drawn to scale, in which.

DETAILED DESCRIPTION

Figure 1:
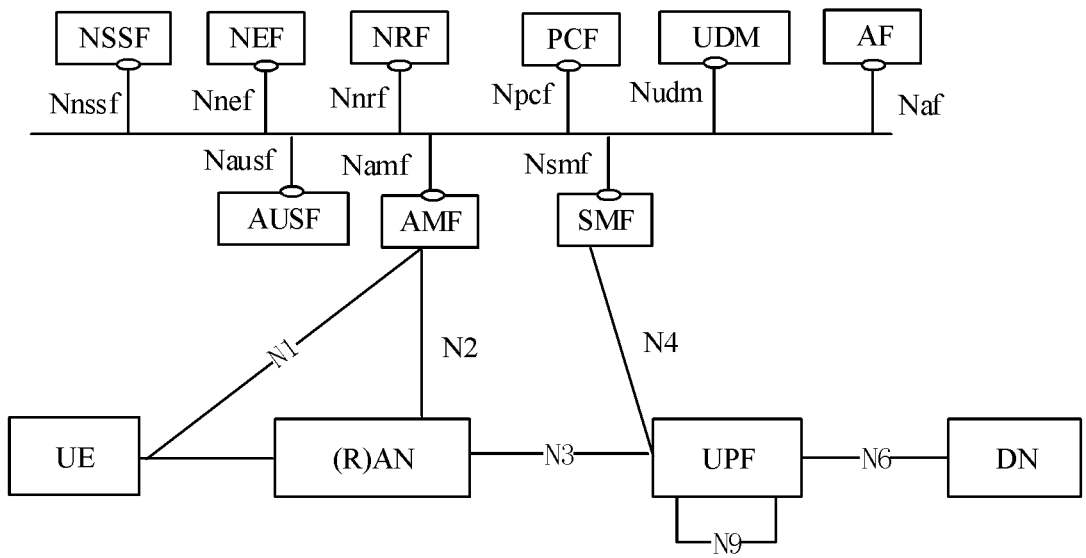
FIG. 1 is a diagram illustrating an exemplary 5G system architecture according to an embodiment of the present disclosure.
Figure 2:
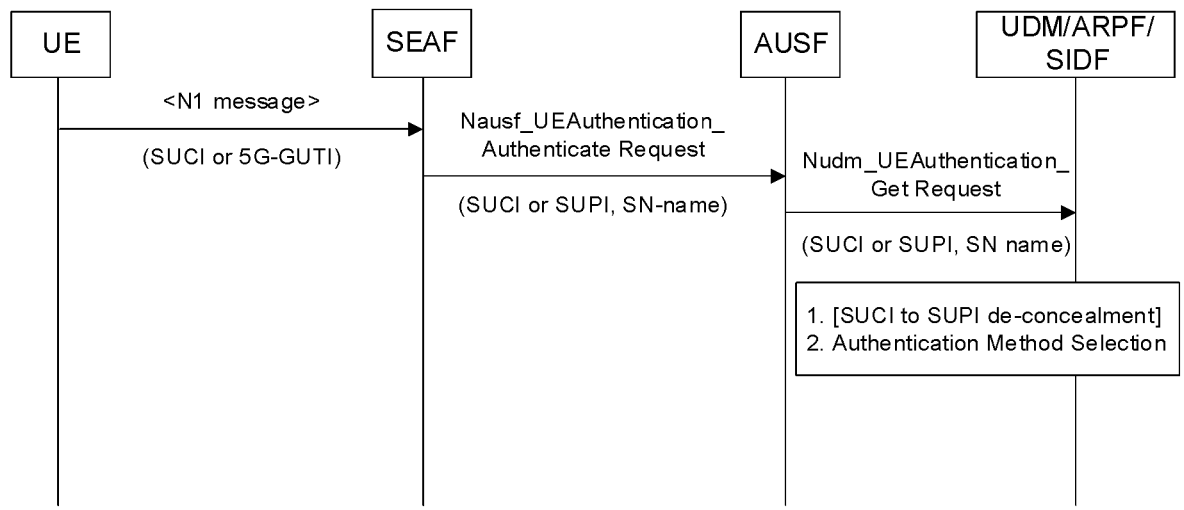
FIG. 2 shows initiation of authentication procedure and selection of authentication method.

The embodiments of the present disclosure are described in detail with reference to the accompanying drawings. It should be understood that these embodiments are discussed only for the purpose of enabling those skilled persons in the art to better understand and thus implement the present disclosure, rather than suggesting any limitations on the scope of the present disclosure. Reference throughout this specification to features, advantages, or similar language does not imply that all of the features and advantages that may be realized with the present disclosure should be or are in any single embodiment of the disclosure. Rather, language referring to the features and advantages is understood to mean that a specific feature, advantage, or characteristic described in connection with an embodiment is included in at least one embodiment of the present disclosure. Furthermore, the described features, advantages, and characteristics of the disclosure may be combined in any suitable manner in one or more embodiments. One skilled in the relevant art will recognize that the disclosure may be practiced without one or more of the specific features or advantages of a particular embodiment. In other instances, additional features and advantages may be recognized in certain embodiments that may not be present in all embodiments of the disclosure.

As used herein, the term "network" refers to a network following any suitable communication standards such as new radio (NR), long term evolution (LTE), LTE-Advanced, and so on. In the following description, the terms "network" and "system" can be used interchangeably. Furthermore, the communications between two devices in the network may be performed according to any suitable communication protocols, including, but not limited to, the communication protocols as defined by some of standards organizations such as 3GPP, the International Telecommunication Union (ITU), the Institute of Electrical and Electronics Engineers (IEEE), and the Internet Engineering Task Force (IETF), etc. For example, the communication protocols as defined by 3GPP may comprise 5G communication protocols, and/or any other protocols either currently known or to be developed in the future.

The term "network device" refers to a network device in a communication network via which a terminal device accesses to the network and receives services therefrom. For example, in a wireless communication network such as a 3GPP-type cellular network, the network device may comprise access network device and core network device. For example, the access network device may comprise base station (BS), an Integrated Access and Backhaul (IAB) node, an access point (AP), a multi-cell/multicast coordination entity (MCE), etc. The BS may be, for example, a node B (NodeB or NB), an evolved NodeB (eNodeB or eNB), a next generation NodeB (gNodeB or gNB), a remote radio unit (RRU), a radio header (RH), a remote radio head (RRH), a relay, a low power node such as a femto, a pico, and so forth. The core network device may comprise a plurality of network devices which may offer numerous services to the customers who are interconnected by the access network device. Each access network device is connectable to the core network device over a wired or wireless connection.

The term "network function (NF)" refers to any suitable function which can be implemented in a network device of a wireless/wired communication network. For example, in 5G network, the network function may comprise AUSF, AMF, DN, NEF, NRF, NSSF, PCF, SMF, UDM, UPF, AF, UE, (R)AN, 5G-Equipment Identity Register (5G-EIR), Security Edge Protection Proxy (SEPP), Network Data Analytics Function (NWDAF), Unified Data Repository (UDR), Unstructured Data Storage Function (UDSF), etc.

The term "terminal device" refers to any end device that can access a communication network and receive services therefrom. By way of example and not limitation, in the wireless communication network, the terminal device may refer to a mobile terminal, a user equipment (UE), a terminal device, or other suitable devices. The terminal device may be, for example, a Subscriber Station (SS), a Portable Subscriber Station, a Mobile Station (MS), or an Access Terminal (AT). The terminal device may include, but not limited to, a portable computer, an image capture device such as a digital camera, a gaming terminal device, a music storage and a playback appliance, a mobile phone, a cellular phone, a smart phone, a voice over IP (VoIP) phone, a wireless local loop phone, a tablet, a wearable device, a personal digital assistant (PDA), a portable computer, a desktop computer, a wearable device, a vehicle-mounted wireless device, a wireless endpoint, a mobile station, a laptop-embedded equipment (LEE), a laptop-mounted equipment (LME), a USB dongle, a smart device, a wireless customer-premises equipment (CPE) and the like. In the following description, the terms "terminal device", "terminal", "user equipment" and "UE" may be used interchangeably. As one example, a UE may represent a terminal device configured for communication in accordance with one or more communication standards promulgated by the 3GPP, such as 3GPP' LTE standard or NR standard. As used herein, a "user equipment" or "UE" may not necessarily have a "user" in the sense of a human user who owns and/or operates the relevant device. In some embodiments, a terminal device may be configured to transmit and/or receive information without direct human interaction. For instance, a UE may be designed to transmit information to a network on a predetermined schedule, when triggered by an internal or external event, or in response to requests from the wireless communication network. Instead, a UE may represent a device that is intended for sale to, or operation by, a human user but that may not initially be associated with a specific human user.

As yet another example, in an Internet of Things (TOT) scenario, a terminal device may represent a machine or other device that performs monitoring and/or measurements, and transmits the results of such monitoring and/or measurements to another terminal device and/or network equipment. The UE may in this case be a machine-to-machine (M2M) device, which may in a 3GPP context be referred to as a machine-type communication (MTC) device. As one particular example, the terminal device may be a UE implementing the 3GPP narrow band internet of things (NB-IoT) standard. Particular examples of such machines or devices are sensors, metering devices such as power meters, industrial machinery, or home or personal appliances, for example refrigerators, televisions, personal wearables such as watches etc. In other scenarios, a UE may represent a vehicle or other equipment that is capable of monitoring and/or reporting on its operational status or other functions associated with its operation.

References in the specification to "one embodiment," "an embodiment," "an example embodiment," and the like indicate that the embodiment described may include a particular feature, structure, or characteristic, but it is not necessary that every embodiment includes the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

It shall be understood that although the terms "first" and "second" etc. may be used herein to describe various elements, these elements should not be limited by these terms. These terms are only used to distinguish one element from another. For example, a first element could be termed a second element, and similarly, a second element could be termed a first element, without departing from the scope of example embodiments. As used herein, the term "and/or" includes any and all combinations of one or more of the associated listed terms.

The terminology used herein is for the purpose of describing particular embodiments only and is not intended to be limiting of example embodiments. As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components etc., but do not preclude the presence or addition of one or more other features, elements, components and/or combinations thereof.

In the following description and claims, unless defined otherwise, all technical and scientific terms used herein have the same meaning as commonly understood by one of ordinary skills in the art to which this disclosure belongs.

Although the subject matter described herein may be implemented in any appropriate type of system (such as the sixth generation (6G) communication system) using any suitable components, the embodiments disclosed herein are described in relation to a communication system complied with the exemplary system architecture illustrated in FIG. 1. The diagram in FIG. 1 may represent a high level architecture in the next generation network such as 5G. For simplicity, the system architecture of FIG. 1 only depicts some exemplary elements such as AUSF, AMF, DN, NEF, NRF, NSSF, PCF, SMF, UDM, UPF, AF, UE, (R)AN. In practice, a communication system may further include any additional elements suitable to support communication between terminal devices or between a wireless device and another communication device, such as a landline telephone, a service provider, or any other network node or terminal device. The communication system may provide communication and various types of services to one or more terminal devices to facilitate the terminal devices' access to and/or use of the services provided by, or via, the communication system.

As further illustrated in FIG. 1, the exemplary system architecture also contains the service-based interfaces such as Nnrf, Nnef, Nausf, Nudm, Npcf, Namf and Nsmf exhibited by NFs such as the NRF, the NEF, the AUSF, the UDM, the PCF, the AMF and the SMF. In addition, FIG. 1 also shows some reference points such as N1, N2, N3, N4, N6 and N9, which can support the interactions between NF services in the NFs. For example, these reference points may be realized through corresponding NF service-based interfaces and by specifying some NF service consumers and providers as well as their interactions in order to perform a particular system procedure.

Various NFs shown in FIG. 1 may be responsible for functions such as session management, mobility management, authentication, and security. The AUSF, AMF, DN, NEF, NRF, NSSF, PCF, SMF, UDM, UPF, AF, UE, (R)AN may include the functionality for example as defined in 3GPP TS 23.501 V16.0.2.

Figure 3:
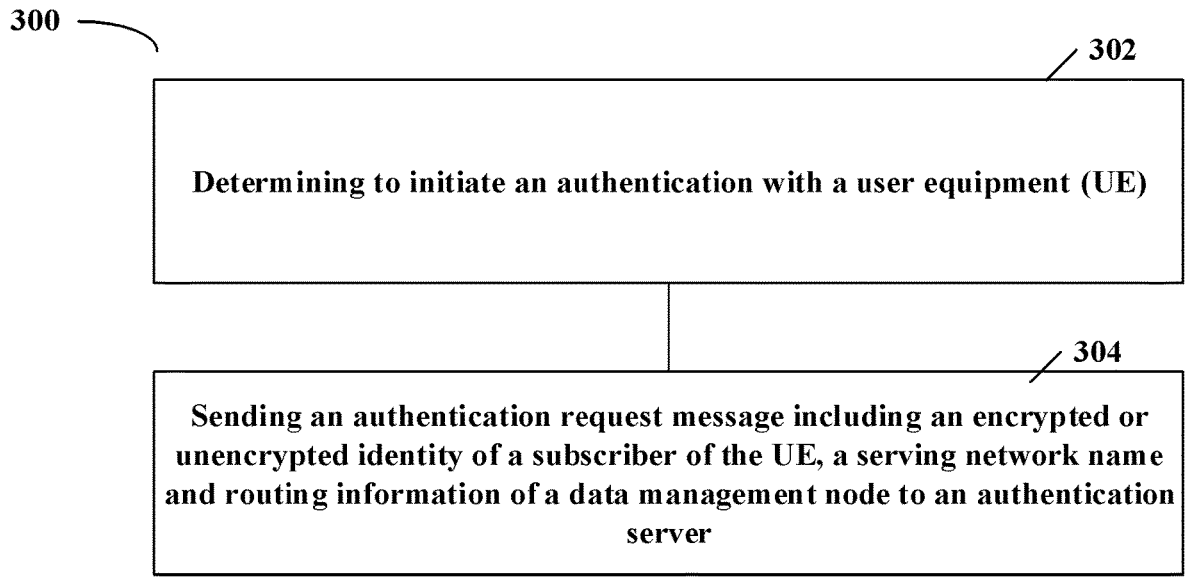
FIG. 3 shows a flowchart of a method according to an embodiment of the present disclosure.

FIG. 3 shows a flowchart of a method 300 according to an embodiment of the present disclosure, which may be performed by an apparatus implemented in or at an access and mobility management node such as the AMF supporting SEAF as shown in FIG. 1 or communicatively coupled to the access and mobility management node. As such, the access and mobility management node may provide means for accomplishing various parts of the method 300 as well as means for accomplishing other processes in conjunction with other components.

At block 302, the access and mobility management node determines to initiate an authentication with a UE. For example, the access and mobility management node may initiate an authentication with the UE during any procedure establishing a signalling connection with the UE, according to the access and mobility management node's policy such as SEAF's policy.

At block 304, the access and mobility management node sends an authentication request message including an encrypted or unencrypted identity of a subscriber of the UE, a serving network name and routing information of a data management node to an authentication server. For example, the authentication server may be AUSF in 5G system or other authentication server in other suitable communication system. The authentication server may be determined in various ways. For example, the access and mobility management node may select the authentication server based on the encrypted or unencrypted identity of the subscriber of the UE. The authentication request message may be a Nausf_UEAuthentication_Authenticate Request message in 5G system or other authentication request message in other suitable communication system.

In 5G system, the serving network name may be similar to the serving network name as specified in 3GPP TS 33.501 V15.4.0. The encrypted identity of the subscriber of the UE may be SUCI and the unencrypted identity of the subscriber of the UE may be SUPI in 5G system. The encrypted or unencrypted identity of the subscriber of the UE may be obtained in various ways. For example, for 3GPP access, the UE may use SUCI or 5G-GUTI in a Registration Request sent to the access and mobility management node such as AMF. When the UE uses 5G-GUTI in the Registration Request, then the access and mobility management node such as AMF may query from local context to resolve it to SUPI. When cannot retrieve the SUPI based on the 5G-GUTI, the AMF may send an identity request message to the UE and receive an identity response message including the encrypted identity of the subscriber of the UE. In addition, the UE may use SUPI in a Registration Request sent to the access and mobility management node such as AMF.

The routing information of the data management node may include a data management node group identifier or a routing indicator. In the 5G system, the data management node group identifier and the routing indicator may be "UDM Group ID" and "Routing Indicator" as defined in 3GPP TS23.501 V15.4.0 respectively. The UDM Group ID refers to one or more UDM instances managing a specific set of SUPIs. The Routing Indicator allows together with SUCI/SUPI and Home Network Identifier to route network signalling to AUSF and UDM instances capable to serve the subscriber.

The routing information of the data management node such as UDM can be determined by the access and mobility management node such as AMF in various ways. In 5G system, the data management node (such as UDM) information structure could be configured locally at the access and mobility management node such as AMF or provisioned/registered into NRF. Table 1 is an example of UDM information in 5G system.

TABLE 1

| Attribute name | Data type | P | Cardinality | Description |
| --- | --- | --- | --- | --- |
| groupId | NfGroupId | O | 0 . . . 1 | Identity of the UDM group that is served by the UDM instance. If not provided, the UDM instance does not pertain to any UDM group. |
| supiRanges | array(SupiRange) | O | 1 . . . N | List of ranges of SUPIs whose profile data is available in the UDM instance (NOTE 1) |
| gpsiRanges | array(IdentityRange) | O | 1 . . . N | List of ranges of GPSIs whose profile data is available in the UDM instance (NOTE 1) |
| externalGroupIdentifiersRanges | array(IdentityRange) | O | 1 . . . N | List of ranges of external groups whose profile data is available in the UDM instance (NOTE 1) |
| routingIndicators | array(string) | O | 1 . . . N | List of Routing Indicator information that allows to route network signalling with SUCI (see 3GPP TS 23.003) to the UDM instance. If not provided, the UDM can serve any Routing Indicator. Pattern: '^[0-9]{1, 4}$' |

NOTE 1:
If none of these parameters is provided, the UDM can serve any external group and any SUPI or GPSI (Generic Public Subscription Identifier).

When the UDM information is configured locally and the identity of a subscriber of the UE received by AMF is 5G-TUGI, AMF may query from its local context to resolve 5G-TUGI to SUPI, and then based on SUPI to match the supiRanges in Table 1. If the SUPI is within the supiRanges, then the corresponding groupId is determined as udmGroupId to be used later. When the identity of a subscriber of the UE is SUCI, AMF decodes the routing indicator from the SUCI, and then the routing indicator is determined as routingIndicator to be used later. Alternatively, AMF could base on routing indicator to match UDM (routingIndicators in Table 1) which could serve the UE and determine the corresponding groupId as udmGroupId to be used later.

When UDM info is not configured locally, AMF sends a request to NRF to query the UDM based on the user identity received by AMF. If the received identity is 5G-TUGI, then AMF may query from local context to resolve it to SUPI, then AMF may query UDM from NRF based on the SUPI. NRF will match the supiRanges in Table 1 based on the SUPI. If the SUPI is within the supiRanges, then the corresponding groupId is determined and returned to AMF which will be used later. If the received identity is SUCI, then AMF decodes the routing indicator from the SUCI, then routing indicator is determined as routingIndicator to be used later. Alternatively AMF could base on routing indicator to query UDM which could serve the UE and determine the corresponding groupId as udmGroupId to be used later.

Figure 4:
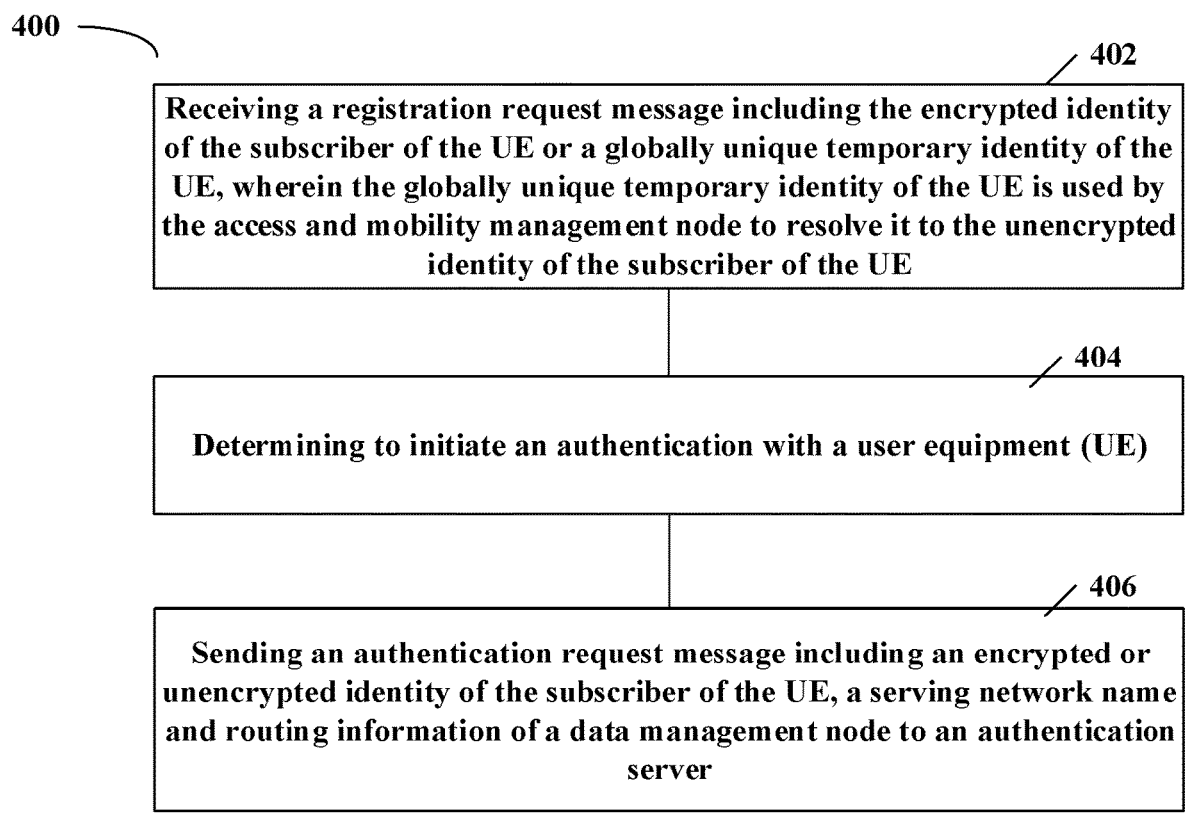
FIG. 4 shows a flowchart of a method according to another embodiment of the present disclosure.

FIG. 4 shows a flowchart of a method 400 according to another embodiment of the present disclosure, which may be performed by an apparatus implemented in or at an access and mobility management node such as the AMF supporting SEAF as shown in FIG. 1 or communicatively coupled to the access and mobility management node. As such, the access and mobility management node may provide means for accomplishing various parts of the method 400 as well as means for accomplishing other processes in conjunction with other components. In this embodiment, the UE will access the network via 3GPP access. For some parts which have been described in the above embodiments, detailed description thereof is omitted here for brevity.

At block 402, the access and mobility management node such as the AMF receives a registration request message including the encrypted identity of the subscriber of the UE or a globally unique temporary identity of the UE. The globally unique temporary identity of the UE may be used by the access and mobility management node to resolve it to the unencrypted identity of the subscriber of the UE. For example, in 5G system, the encrypted identity of the subscriber of the UE is a Subscription Concealed Identifier (SUCI), the unencrypted identity of the subscriber of the UE is Subscription Permanent Identifier (SUPI), and the globally unique temporary identity of the UE is the fifth generation-Globally Unique Temporary UE Identity (5G-GUTI).

At block 404, the access and mobility management node such as the AMF determines to initiate an authentication with the UE. Block 404 is similar to block 302 of FIG. 3.

At block 406, the access and mobility management node such as the AMF sends an authentication request message including an encrypted or unencrypted identity of the subscriber of the UE, a serving network name and routing information of a data management node to an authentication server. Block 406 is similar to block 304 of FIG. 3.

Figure 5:
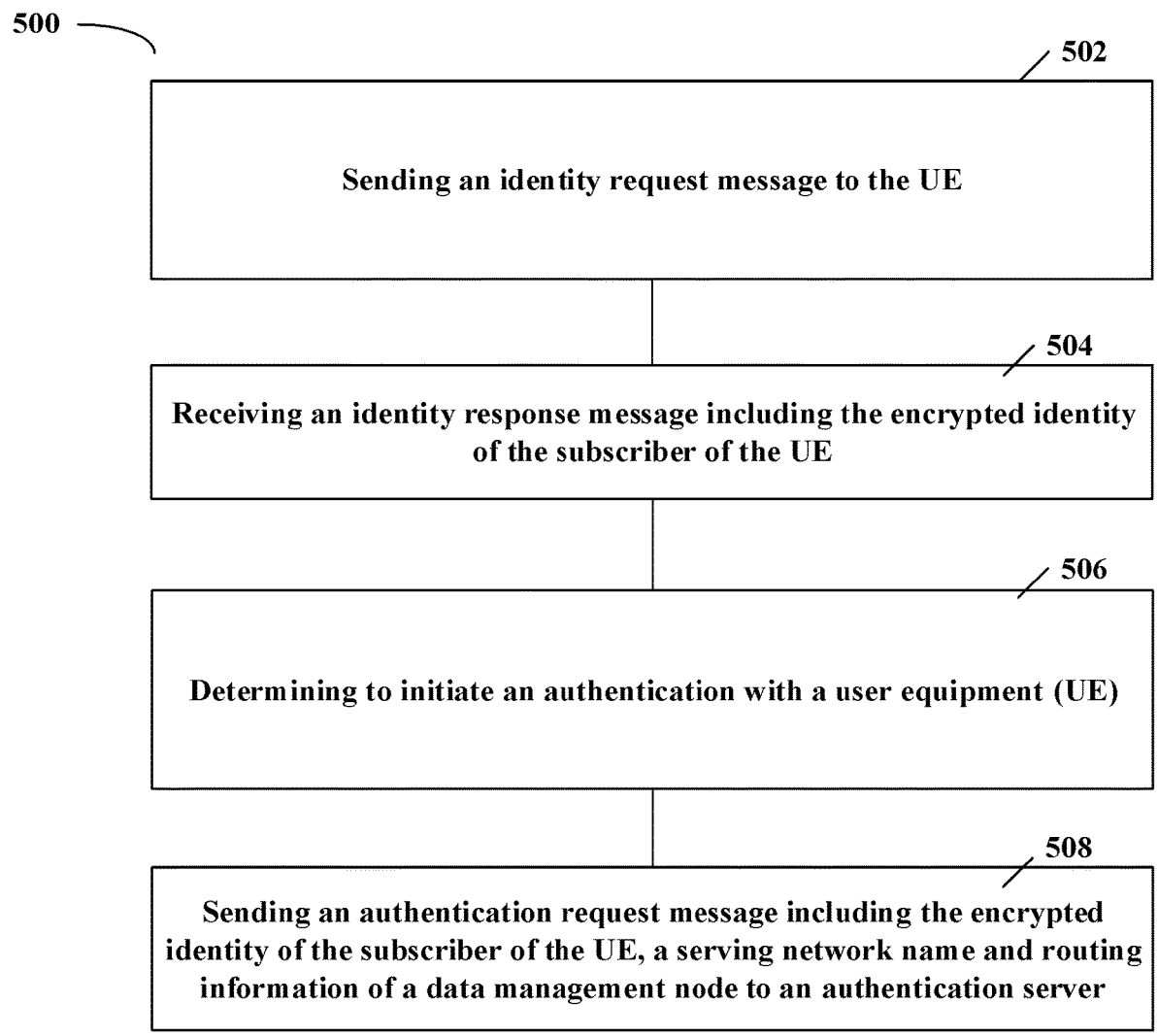
FIG. 5 shows a flowchart of a method according to another embodiment of the present disclosure.

FIG. 5 shows a flowchart of a method 500 according to another embodiment of the present disclosure, which may be performed by an apparatus implemented in or at an access and mobility management node such as the AMF supporting SEAF as shown in FIG. 1 or communicatively coupled to the access and mobility management node. As such, the access and mobility management node may provide means for accomplishing various parts of the method 500 as well as means for accomplishing other processes in conjunction with other components. In this embodiment, the UE will access the network via access for example as specified in clause 4.12 of 3GPP TS 23.502 V16.0.2, the disclosure of which is incorporated by reference herein in its entirety. For some parts which have been described in the above embodiments, detailed description thereof is omitted here for brevity.

At block 502, the access and mobility management node such as the AMF sends an identity request message to the UE. For example, the AMF may request the SUCI by sending a Non-Access-Stratum (NAS) Identity Request message to UE.

At block 504, the access and mobility management node such as the AMF receives an identity response message including the encrypted identity of the subscriber of the UE. For example, the AMF may receive an Identity Response message including the SUCI from the UE.

At block 506, the access and mobility management node such as the AMF determines to initiate an authentication with the UE. Block 506 is similar to block 302 of FIG. 3.

At block 508, the access and mobility management node such as the AMF sends an authentication request message including an encrypted identity of a subscriber of the UE, a serving network name and routing information of a data management node to an authentication server. Block 508 is similar to block 304 of FIG. 3.

Figure 6:
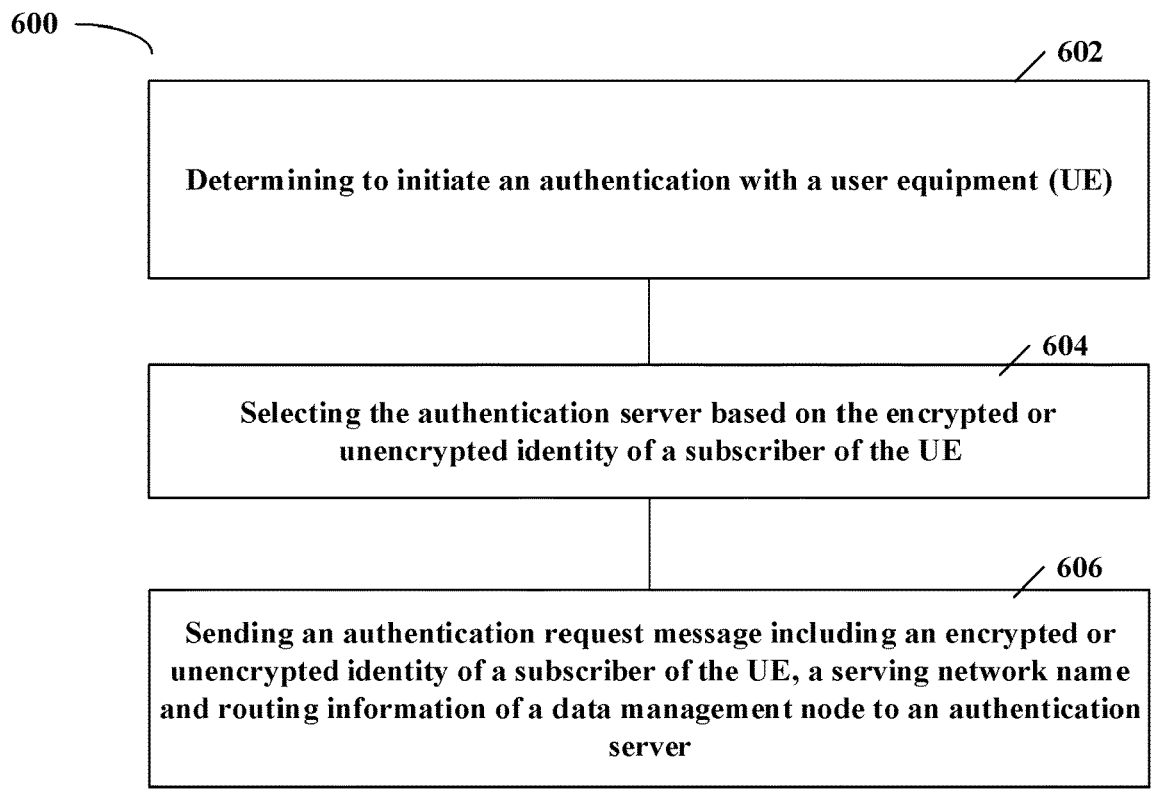
FIG. 6 shows a flowchart of a method according to another embodiment of the present disclosure.

FIG. 6 shows a flowchart of a method 600 according to another embodiment of the present disclosure, which may be performed by an apparatus implemented in or at an access and mobility management node such as the AMF supporting SEAF as shown in FIG. 1 or communicatively coupled to the access and mobility management node. As such, the access and mobility management node may provide means for accomplishing various parts of the method 600 as well as means for accomplishing other processes in conjunction with other components. For some parts which have been described in the above embodiments, detailed description thereof is omitted here for brevity.

At block 602, the access and mobility management node such as the AMF determines to initiate an authentication with a UE. Block 602 is similar to block 302 of FIG. 3.

At block 604, the access and mobility management node such as the AMF selects the authentication server based on the encrypted or unencrypted identity of a subscriber of the UE. For example, in 5G system, AMF may select the AUSF based on SUPI or SUCI.

At block 606, the access and mobility management node such as the AMF sends an authentication request message including an encrypted or unencrypted identity of a subscriber of the UE, a serving network name and routing information of a data management node to an authentication server. Block 606 is similar to block 304 of FIG. 3.

In various embodiments, the access and mobility management node may be an AMF node supporting SEAF, the authentication server may be an AUSF node and the data management node may be a UDM node.

Figure 7:
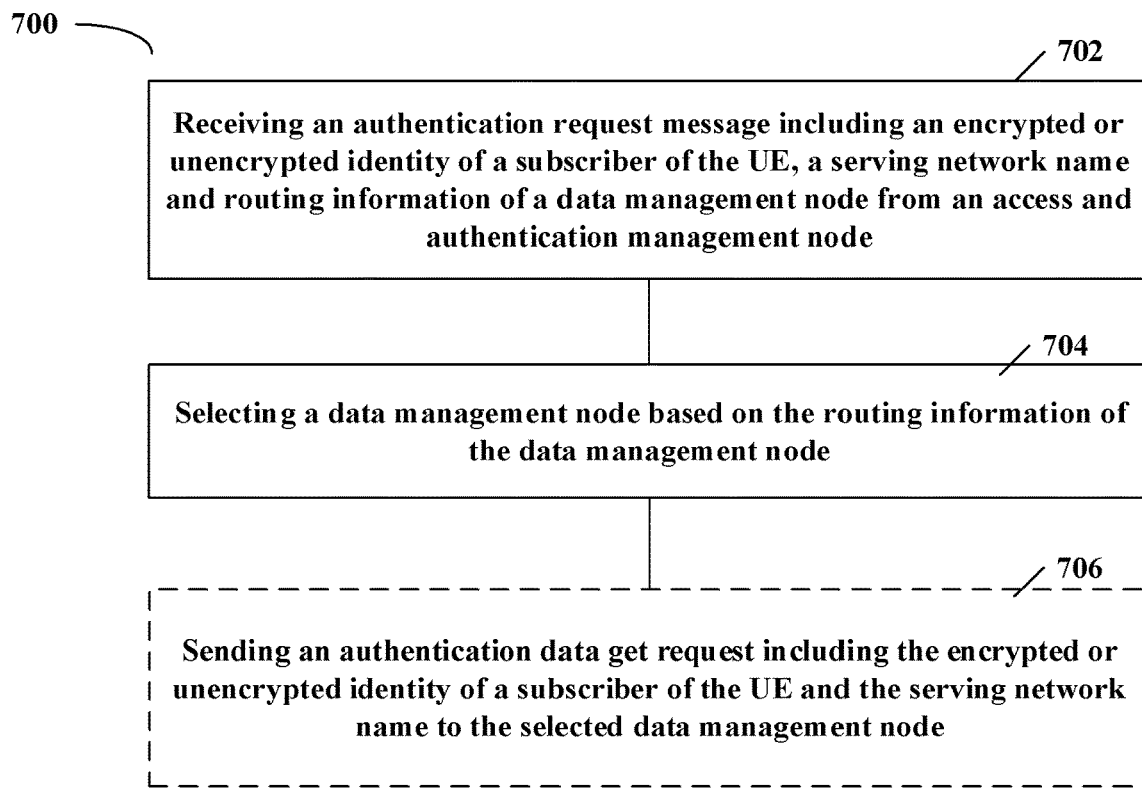
FIG. 7 shows a flowchart of a method according to another embodiment of the present disclosure.

FIG. 7 shows a flowchart of a method 700 according to another embodiment of the present disclosure, which may be performed by an apparatus implemented in or at an authentication server such as the AUSF as shown in FIG. 1 or communicatively coupled to an authentication server such as the AUSF. As such, the authentication server may provide means for accomplishing various parts of the method 700 as well as means for accomplishing other processes in conjunction with other components. For some parts which have been described in the above embodiments, detailed description thereof is omitted here for brevity.

At block 702, the authentication server such as the AUSF receives an authentication request message including an encrypted or unencrypted identity of a subscriber of the UE, a serving network name and routing information of a data management node from an access and authentication management node. For example, the access and authentication management node may send this authentication request message as described in blocks 304, 406, 508 and 606 of FIGS. 3-6, and then the authentication server such as the AUSF may receive this authentication request message. In an embodiment, the encrypted identity of the subscriber of the UE may be a Subscription Concealed Identifier (SUCI) and the unencrypted identity of the subscriber of the UE may be Subscription Permanent Identifier (SUPI).

At block 704, the authentication server such as the AUSF selects a data management node based on the routing information of the data management node. For example, when data management node such as UDM information is configured locally in the authentication server such as the AUSF, the authentication server such as the AUSF can base on the routing information to match a corresponding data management node. In an embodiment, the routing information of the data management node may include a data management node group identifier or a routing indicator of the UE. When data management node (such as UDM) information such as Table 1 is configured locally in the authentication server such as the AUSF, the authentication server such as the AUSF can base on the routing indicator or the group identifier to match UDM (routingIndicators or groupId in above Table 1).

At block 706 (optional), the authentication server such as the AUSF sends an authentication data get request including the encrypted or unencrypted identity of a subscriber of the UE and the serving network name to the selected data management node. For example, in 5G system, the authentication data get request may be similar to Nudm_UEAuthentication_Get Request sent from AUSF to UDM as described in clause 6.1.2 of 3GPP TS33.501 V15.4.0.

In an embodiment, Nausf_UEAuthentication API (Application Program Interface) of 3GPP TS 29.509 V15.3.0 may be updated as following:

```
openapi: 3.0.0
info:
  version: 1.0.1
  title: AUSF API
  description: OpenAPI specification for AUSF
servers:
  - url: '{apiRoot}/nausf-auth/v1'
    variables:
      apiRoot:
        default: https://example.com
        description: apiRoot as defined in subclause subclause 4.4 of 3GPP TS 29.501.
security:
  - { }
  - oAuth2ClientCredentials:
    - nausf-auth
paths:
  /ue-authentications:
    post:
      requestBody:
        content:
          application/json:
            schema:
              $ref: '#/components/schemas/AuthenticationInfo'
        required: true
      responses:
        '201':
          description: UEAuthenticationCtx
          content:
            application/3gppHal+json:
              schema:
                $ref: '#/components/schemas/UEAuthenticationCtx'
          headers:
            Location:
              description: 'Contains the URI of the newly created resource according to the structure: {apiRoot}/nausf-auth/v1/ue-authentications/{authCtxId}'
              required: true
              schema:
                type: string
        '400':
          description: Bad Request from the AMF
          content:
            application/problem+json:
              schema:
                $ref: 'TS29571_CommonData.yaml#/components/schemas/ProblemDetails'
        '403':
          description: Forbidden due to serving network not authorized
          content:
            application/problem+json:
              schema:
                $ref: 'TS29571_CommonData.yaml#/components/schemas/ProblemDetails'
        '500':
          description: Internal Server Error
          content:
            application/problem+json:
              schema:
                $ref: 'TS29571_CommonData.yaml#/components/schemas/ProblemDetails'
  /ue-authentications/{authCtxId}/5g-aka-confirmation:
```

```
put:
   parameters:
     - name: authCtxId
       in: path
       required: true
       schema:
         type: string
   requestBody:
     content:
       application/json:
         schema:
           $ref: '#/components/schemas/ConfirmationData'
   responses:
     '200':
       description: Request processed (EAP success or Failure)
       content:
         application/json:
           schema:
             $ref: '#/components/schemas/ConfirmationDataResponse'
     '400':
       description: Bad Request
       content:
         application/problem+json:
           schema:
             $ref: 'TS29571_CommonData.yaml#/components/schemas/ProblemDetails'
     '500':
       description: Internal Server Error
       content:
         application/problem+json:
           schema:
             $ref: 'TS29571_CommonData.yaml#/components/schemas/ProblemDetails'
/ue-authentications/{authCtxId}/eap-session:
   post:
     operationId: EapAuthMethod
     parameters:
       - name: authCtxId
         in: path
         required: true
         schema:
           type: string
     requestBody:
       content:
         application/json:
           schema:
             $ref: '#/components/schemas/EapSession'
     responses:
       '200':
         description: Use to handle or close the EAP session
         content:
           application/json:
             schema:
               $ref: '#/components/schemas/EapSession'
           application/3gppHal+json:
             schema:
               type: object
               properties:
                 eapPayload:
                   $ref: '#/components/schemas/EapPayload'
                 _links:
                   type: object
                   description: 'URI : /{eapSessionUri}'
                   additionalProperties:
                     $ref: 'TS29571_CommonData.yaml#/components/schemas/LinksValueSchema'
                   minProperties: 1
               required:
                 - eapPayload
                 - links
       '400':
         description: Bad Request
         content:
           application/problem+json:
             schema:
               $ref: 'TS29571_CommonData.yaml#/components/schemas/ProblemDetails'
       '500':
         description: Internal Server Error
         content:
           application/problem+json:
             schema:
               $ref: 'TS29571_CommonData.yaml#/components/schemas/ProblemDetails'
```

```
components:
  securitySchemes:
    oAuth2ClientCredentials:
      type: oauth2
      flows:
        clientCredentials:
          tokenUrl: '{nrfApiRoot}/oauth2/token'
          scopes:
            nausf-auth: Access to Nausf_UEAuthentication API
  schemas:
    AuthenticationInfo:
      type: object
      properties:
        supiOrSuci:
          $ref: 'TS29503_Nudm_UEAU.yaml#/components/schemas/SupiOrSuci'
        servingNetworkName:
          $ref: 'TS29503_Nudm_UEAU.yaml#/components/schemas/ServingNetworkName'
        resynchronizationInfo:
          $ref: 'TS29503_Nudm_UEAU.yaml#/components/schemas/ResynchronizationInfo'
        traceData:
          $ref: 'TS29571_CommonData.yaml#/components/schemas/TraceData'
        udmGroupId:
          $ref: 'TS29571_CommonData.yaml#/components/schemas/NfGroupId'
        routingIndicator:
          type: string
      required:
        - supiOrSuci
        - servingNetworkName
    UEAuthenticationCtx:
      type: object
      properties:
        authType:
          $ref: '#/components/schemas/AuthType'
        5gAuthData:
          oneOf:
            - $ref: '#/components/schemas/Av5gAka'
            - $ref: '#/components/schemas/EapPayload'
        _links:
          type: object
          additionalProperties:
            $ref: 'TS29571_CommonData.yaml#/components/schemas/LinksValueSchema'
        servingNetworkName:
          $ref: 'TS29503_Nudm_UEAU.yaml#/components/schemas/ServingNetworkName'
      required:
        - authType
        - 5gAuthData
        - _links
    Av5gAka:
      type: object
      required:
        - rand
        - hxresStar
        - autn
      properties:
        rand:
          $ref: 'TS29503_Nudm_UEAU.yaml#/components/schemas/Rand'
        hxresStar:
          $ref: '#/components/schemas/HxresStar'
        autn:
          $ref: 'TS29503_Nudm_UEAU.yaml#/components/schemas/Autn'
    ConfirmationData:
      type: object
      required:
        - resStar
      properties:
        resStar:
          $ref: '#/components/schemas/ResStar'
    ConfirmationDataResponse:
      type: object
      properties:
        authResult:
          $ref: '#/components/schemas/AuthResult'
        supi:
          $ref: 'TS29571_CommonData.yaml#/components/schemas/Supi'
        kseaf:
          $ref: '#/components/schemas/Kseaf'
      required:
        - authResult
```

```
EapSession:
    type: object
    properties:
        eapPayload:
            $ref: '#/components/schemas/EapPayload'
        kSeaf:
            $ref: '#/components/schemas/Kseaf'
        _links:
            type: object
            additionalProperties:
                $ref: 'TS29571_CommonData.yaml#/components/schemas/LinksValueSchema'
        authResult:
            $ref: '#/components/schemas/AuthResult'
        supi:
            $ref: 'TS29571_CommonData.yaml#/components/schemas/Supi'
    required:
        - eapPayload
AuthResult:
    type: string
    enum:
        - AUTHENTICATION_SUCCESS
        - AUTHENTICATION_FAILURE
        - AUTHENTICATION_ONGOING
EapPayload:
    type: string
    format: base64
    description: contains an EAP packet
Kseaf:
    type: string
    pattern: '[A-Fa-f0-9]{64}'
ResStar:
    type: string
    pattern: '[A-Fa-f0-9]{32}'
    nullable: true
HxresStar:
    type: string
    pattern: "[A-Fa-f0-9]{32}"
AuthType:
    anyOf:
        - type: string
          enum:
              - 5G_AKA
              - EAP_AKA_PRIME
              - EAP_TLS
        - type: string
externalDocs:
    description: 3GPP TS 29.509 V15.3.0; 5G System; 3GPP TS Authentication Server services.
    url: http://www.3gpp.org/ftp/Specs/archive/29_series/29.509
```

In an embodiment, Table 6.1.6.2.2-1 of 3GPP TS 29.509 V15.3.0 may be updated as following:

TABLE 2

Definition of type AuthenticationInfo

| Attribute name | Data type | P | Cardinality | Description |
| --- | --- | --- | --- | --- |
| supiOrSuci | SupiOrSuci | M | 1 | Contains the SUPI or SUCI of the UE. |
| servingNetworkName | ServingNetworkName | M | 1 | Contains the Serving Network Name. |
| resynchronizationInfo | ResynchronizationInfo | O | 0 . . . 1 | Contains RAND and AUTS; see 3GPP TS 33.501 [8] subclause 9.4. |
| traceData | TraceData | O | 0 . . . 1 | Contains TraceData provided by the UDM to the AMF |
| udmGroupId | NfGroupId | O | 0 . . . 1 | Identity of the UDM group serving the supi |
| routingIndicator | string | O | 0 . . . 1 | When present, it shall indicate the Routing Indicator of the UE. |

Figure 8:
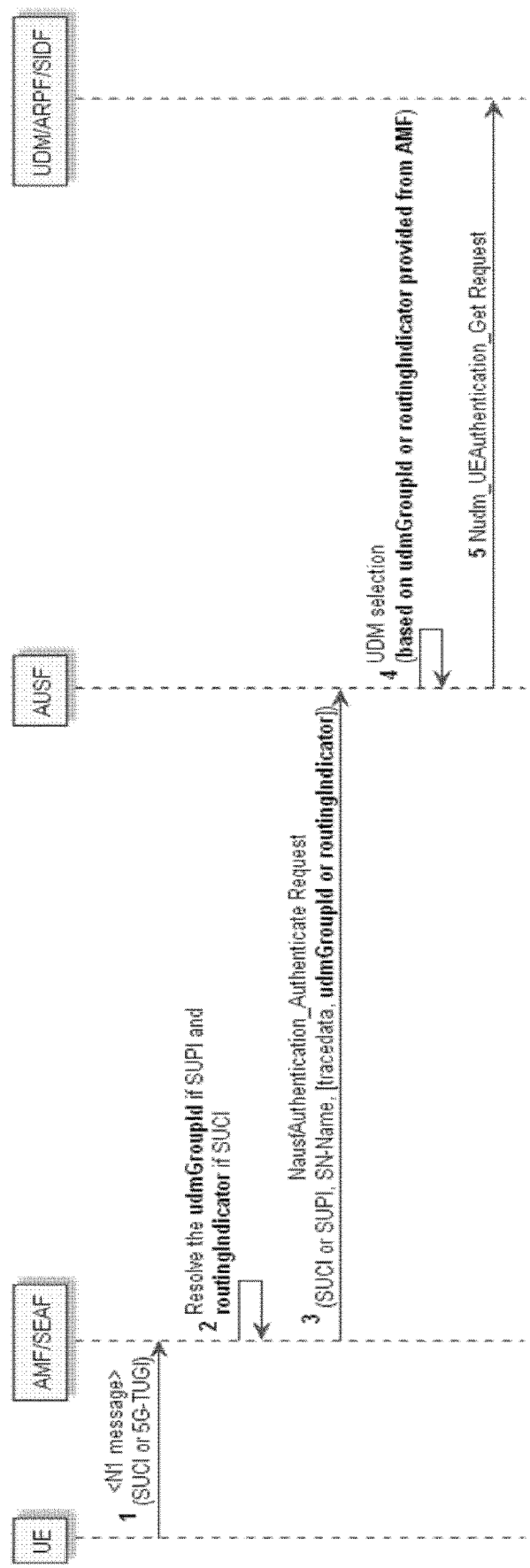
FIG. 8 shows a flowchart of a method according to another embodiment of the present disclosure.

FIG. 8 shows a flowchart of a method 800 according to another embodiment of the present disclosure, which may be implemented in a 5G system.

At step 1, UE may send SUCI or 5G-TUGI in a Registration Request (N1 message) to AMF/SEAF.

At step 2, AMF/SEAF may base on the SUPI to resolve the UDM group ID (for example based on local configuration or by querying from NRF) which may be used in later phases or base on SUCI to decode the routing indicator of the UE which may be used in later phases.

At step 3, AMF selects an AUSF based on SUPI or SUCI and invokes Nausf_UEAuthentication service by sending a Nausf_UEAuthentication_Authenticate Request message to the AUSF when the AMF/SEAF wishes to initiate an authentication with the UE during any procedure establishing a signalling connection with the UE according to the AMF/SEAF's policy. Nausf_UEAuthentication_Authenticate Request message includes the resolved UDM group ID or routing indicator of the UE.

At step 4, AUSF discovers and selects UDM based on the routing information from AMF, either udmGroupId or routingIndicator. As either udpGroupId or routing indicator is provided from AMF in step 3, AUSF could save the complex operation to resolve UDM to serve the UE. Also depending on whether the UDM information is confirmed locally at AUSF or provisioned/registered in NRF, if UDM Information is configured locally and udmGroupId is provided in the request from step 3, then AUSF uses the UDM having the udmGroupId to serve the UE or if routingIndicator is provided in the request from step 3, then AUSF uses the UDM having the routingIndicator to serve the UE.

At step 5, AUSF sends a Nudm_UEAuthentication_get request to the selected UDM for continuing the primary UE authentication procedure.

Many advantages may be achieved by applying the proposed solution according to embodiments of the present disclosure. For example, some embodiments of the present disclosure may facilitate the service discovery and selection in a NF consumer such as AUSF and improve the end to end service operation efficiency as the service discovery and selection is simplified in the NF consumer such as AUSF.

The various blocks shown in FIG. 3-8 may be viewed as method steps, and/or as operations that result from operation of computer program code, and/or as a plurality of coupled logic circuit elements constructed to carry out the associated function(s). The schematic flow chart diagrams described above are generally set forth as logical flow chart diagrams. As such, the depicted order and labeled steps are indicative of specific embodiments of the presented methods. Other steps and methods may be conceived that are equivalent in function, logic, or effect to one or more steps, or portions thereof, of the illustrated methods. Additionally, the order in which a particular method occurs may or may not strictly adhere to the order of the corresponding steps shown.

Figure 9A:
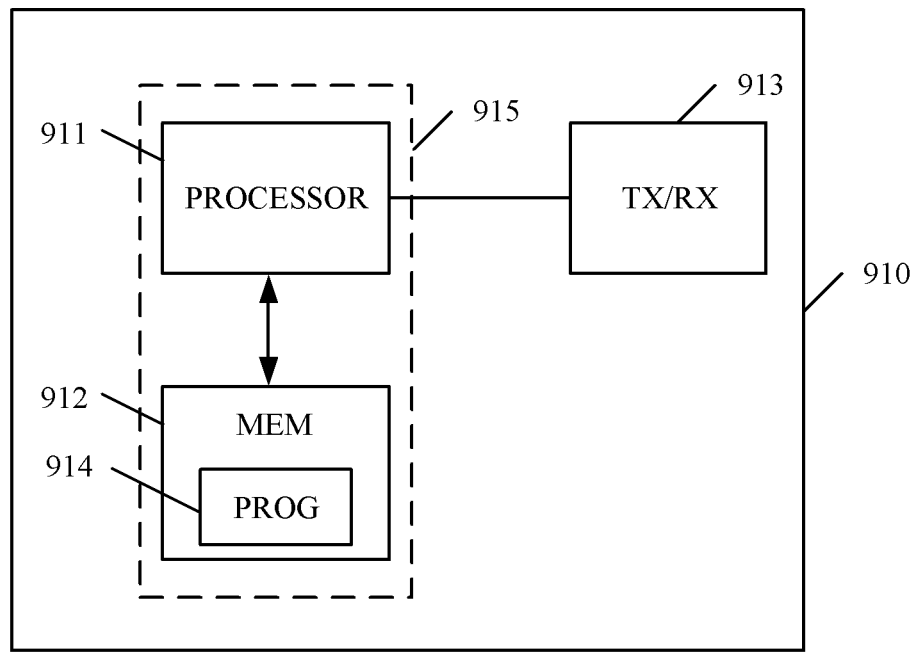
FIG. 9a illustrates simplified block diagrams of an apparatus according to an embodiment of the present disclosure.
Figure 9B:
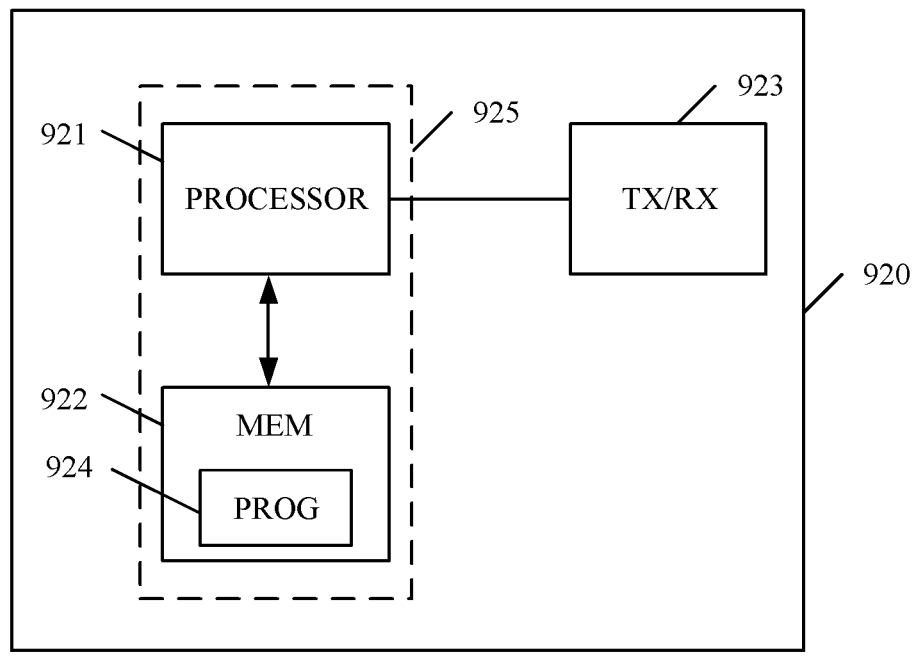
FIG. 9b illustrates simplified block diagrams of an apparatus according to another embodiment of the present disclosure.

FIG. 9a illustrates a simplified block diagram of an apparatus 910 that may be embodied in/as an access and authentication management node according to an embodiment of the present disclosure. FIG. 9b illustrates an apparatus 920 that may be embodied in/as an authentication server according to an embodiment of the present disclosure.

The apparatus 910 may comprise at least one processor 911, such as a data processor (DP) and at least one memory (MEM) 912 coupled to the processor 911. The apparatus 910 may further comprise a transmitter TX and receiver RX 913 coupled to the processor 911. The MEM 912 stores a program (PROG) 914. The PROG 914 may include instructions that, when executed on the associated processor 911, enable the apparatus 910 to operate in accordance with the embodiments of the present disclosure, for example to perform any of the methods related to the first network function repository node as described above. A combination of the at least one processor 911 and the at least one MEM 912 may form processing means 915 adapted to implement various embodiments of the present disclosure.

The apparatus 920 comprises at least one processor 921, such as a DP, and at least one MEM 922 coupled to the processor 921. The apparatus 920 may further comprise a transmitter TX and receiver RX 923 coupled to the processor 921. The MEM 922 stores a PROG 924. The PROG 924 may include instructions that, when executed on the associated processor 921, enable the apparatus 920 to operate in accordance with the embodiments of the present disclosure, for example to perform any of the methods related to the second network function repository node as described above. A combination of the at least one processor 921 and the at least one MEM 922 may form processing means 925 adapted to implement various embodiments of the present disclosure.

Various embodiments of the present disclosure may be implemented by computer program executable by one or more of the processors 911 and 921, software, firmware, hardware or in a combination thereof.

The MEMS 912 and 922 may be of any type suitable to the local technical environment and may be implemented using any suitable data storage technology, such as semiconductor based memory devices, magnetic memory devices and systems, optical memory devices and systems, fixed memories and removable memories, as non-limiting examples.

The processors 911 and 921 may be of any type suitable to the local technical environment, and may include one or more of general purpose computers, special purpose computers, microprocessors, digital signal processors DSPs and processors based on multicore processor architecture, as non-limiting examples.

According to an aspect of the disclosure it is provided a computer program product being tangibly stored on a computer readable storage medium and including instructions which, when executed on at least one processor, cause the at least one processor to carry out any of the methods related to the access and authentication management node as described above.

According to an aspect of the disclosure it is provided a computer program product being tangibly stored on a computer readable storage medium and including instructions which, when executed on at least one processor, cause the at least one processor to carry out any of the methods related to the authentication server as described above.

According to an aspect of the disclosure it is provided a computer-readable storage medium storing instructions which when executed by at least one processor, cause the at least one processor to carry out any of the methods related to the access and authentication management node as described above.

According to an aspect of the disclosure it is provided a computer-readable storage medium storing instructions which when executed by at least one processor, cause the at least one processor to carry out any of the methods related to the authentication server as described above.

In addition, the present disclosure may also provide a carrier containing the computer program as mentioned above, wherein the carrier is one of an electronic signal, optical signal, radio signal, or computer readable storage medium. The computer readable storage medium can be, for example, an optical compact disk or an electronic memory device like a RAM (random access memory), a ROM (read only memory), Flash memory, magnetic tape, CD-ROM, DVD, Blue-ray disc and the like.

The techniques described herein may be implemented by various means so that an apparatus implementing one or more functions of a corresponding apparatus described with an embodiment comprises not only prior art means, but also means for implementing the one or more functions of the corresponding apparatus described with the embodiment and it may comprise separate means for each separate function or means that may be configured to perform two or more functions. For example, these techniques may be implemented in hardware (one or more apparatuses), firmware (one or more apparatuses), software (one or more modules), or combinations thereof. For a firmware or software, implementation may be made through modules (e.g., procedures, functions, and so on) that perform the functions described herein.

Exemplary embodiments herein have been described above with reference to block diagrams and flowchart illustrations of methods and apparatuses. It will be understood that each block of the block diagrams and flowchart illustrations, and combinations of blocks in the block diagrams and flowchart illustrations, respectively, can be implemented by various means including computer program instructions. These computer program instructions may be loaded onto a general purpose computer, special purpose computer, or other programmable data processing apparatus to produce a machine, such that the instructions which execute on the computer or other programmable data processing apparatus create means for implementing the functions specified in the flowchart block or blocks.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the subject matter described herein, but rather as descriptions of features that may be specific to particular embodiments. Certain features that are described in the context of separate embodiments may also be implemented in combination in a single embodiment. Conversely, various features that are described in the context of a single embodiment may also be implemented in multiple embodiments separately or in any suitable sub-combination.

While this specification contains many specific implementation details, these should not be construed as limitations on the scope of any implementation or of what may be claimed, but rather as descriptions of features that may be specific to particular embodiments of particular implementations. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

It will be obvious to a person skilled in the art that, as the technology advances, the inventive concept can be implemented in various ways. The above described embodiments are given for describing rather than limiting the disclosure, and it is to be understood that modifications and variations may be resorted to without departing from the spirit and scope of the disclosure as those skilled in the art readily understand. Such modifications and variations are considered to be within the scope of the disclosure and the appended claims. The protection scope of the disclosure is defined by the accompanying claims.

What is claimed is:

1. A method at an access and mobility management node, comprising:
    sending an authentication request message including an encrypted or unencrypted identity of a subscriber of user equipment (UE), a serving network name and routing information of a data management node to an authentication server;
    wherein the routing information of the data management node includes:
        a data management node group identifier identifying a data management node group serving the unencrypted identity of the subscriber of the UE; and/or
        a routing indicator of the UE.

2. The method according to claim 1, further comprising:
    receiving a registration request message including the encrypted identity of the subscriber of the UE or a globally unique temporary identity of the UE, wherein the globally unique temporary identity of the UE is used by the access and mobility management node to resolve it to the unencrypted identity of the subscriber of the UE.

3. The method according to claim 2, wherein the encrypted identity of the subscriber of the UE is a Subscription Concealed Identifier (SUCI), the unencrypted identity of the subscriber of the UE is Subscription Permanent Identifier (SUPI), and the globally unique temporary identity of the UE is the fifth generation-Globally Unique Temporary UE Identity (5G-GUTI).

4. The method according to claim 1, further comprising:
    sending an identity request message to the UE; and
    receiving an identity response message including the encrypted identity of the subscriber of the UE.

5. The method according to claim 4, wherein the encrypted identity of the subscriber of the UE is a Subscription Concealed Identifier (SUCI).

6. The method according to claim 1, wherein the data management node group identifier is determined based on the unencrypted identity of the subscriber of the UE and the routing indicator is determined based on the encrypted identity of the subscriber of the UE.

7. The method according to claim 1, further comprising selecting the authentication server based on the encrypted or unencrypted identity of a subscriber of the UE.

8. The method according to claim 1, wherein the access and mobility management node is an access and mobility management function (AMF) node supporting security anchor function (SEAF), the authentication server is an authentication server function (AUSF) node and the data management node is a Unified Data Management (UDM) node.

9. The method according to claim 8, wherein the authentication request message is a Nausf_UEAuthentication_Authenticate Request message.

10. An apparatus at an access and authentication management node, comprising:
    a processor; and
    a memory coupled to the processor, said memory containing instructions executable by said processor to:
        send an authentication request message including an encrypted or unencrypted identity of a subscriber of a user equipment (UE), a serving network name and routing information of a data management node from an access and authentication management node to an authentication server;
    wherein the routing information of the data management node includes:
        a data management node group identifier identifying a data management node group serving the unencrypted identity of the subscriber of the UE; and/or
        a routing indicator of the UE.

11. The apparatus according to claim 10, further comprising instructions for said processor to:
- receive a registration request message including the encrypted identity of the subscriber of the UE or a globally unique temporary identity of the UE, wherein the globally unique temporary identity of the UE is used by the access and mobility management node to resolve it to the unencrypted identity of the subscriber of the UE.

12. The apparatus according to claim 11, wherein the encrypted identity of the subscriber of the UE is a Subscription Concealed Identifier (SUCI), the unencrypted identity of the subscriber of the UE is Subscription Permanent Identifier (SUPI), and the globally unique temporary identity of the UE is the fifth generation-Globally Unique Temporary UE Identity (5G-GUTI).

13. The apparatus according to claim 10, further comprising instructions for said processor to:
- send an identity request message to the UE; and
- receive an identity response message including the encrypted identity of the subscriber of the UE.

\* \* \* \* \*